United States Patent
Hsieh

(10) Patent No.: US 6,404,079 B1
(45) Date of Patent: Jun. 11, 2002

(54) MULTI-PURPOSE CONTROL DEVICE WITH A REMOTE CONTROLLER AND A SENSOR

(76) Inventor: Chin-Mu Hsieh, No. 5, Lane 93, Kungyuan Rd., Yungkang City, Tainan Hsien (TW)

( * ) Notice: Subject to any disclaimer, the term of this patent is extended or adjusted under 35 U.S.C. 154(b) by 0 days.

(21) Appl. No.: 09/447,768

(22) Filed: Nov. 23, 1999

(51) Int. Cl.⁷ .............................................. H05B 37/02
(52) U.S. Cl. ..................................... 307/117; 307/116
(58) Field of Search ................................ 307/116, 117

(56) References Cited

U.S. PATENT DOCUMENTS

| | | | | |
|---|---|---|---|---|
| 5,489,827 A | * | 2/1996 | Xia .............................. | 315/294 |
| 6,023,224 A | * | 2/2000 | Meyvis ......................... | 340/545 |
| 6,107,938 A | * | 8/2000 | Du et al. ...................... | 307/117 |
| 6,137,405 A | * | 10/2000 | Carney ......................... | 340/541 |

FOREIGN PATENT DOCUMENTS

| DE | 29701901 U1 | * | 5/1997 | ............ H04Q/9/00 |
|---|---|---|---|---|
| GB | 2264379 A | * | 8/1993 | ........... H05B/37/02 |

* cited by examiner

Primary Examiner—Fritz Fleming
(74) Attorney, Agent, or Firm—William E. Pelton, Esq.

(57) ABSTRACT

The present invention provides a multi-purpose control device with a remote controller and a sensor. The multi-purpose control device includes a detecting body, a remote controller for controlling the detecting body, and a receiver connected to a light. The detecting body is positioned at an entry way to form a sensing region, thereby the detecting body is not only able to receive a remote control signal emitted from the remote controller but also to sense human bodies entering the sensing region. After the detecting body receives the remote control signal or senses a human body entering the sensing region, the detecting body emits a signal to the receiver to actuate a light. The control device does not require reconfiguration of wiring. The present invention can sense a human body entering a sensing region in the dark to actuate a light automatically. The remote controller associated with the detecting body can provide multiple remote functions, including a lux level setting and a time setting.

3 Claims, 6 Drawing Sheets

MULTI-PURPOSE CONTROL DEVICE WITH A REMOTE CONTROLLER AND A SENSOR

BACKGROUND OF THE INVENTION

1. Field of the Invention

The present invention relates to a multi-purpose control device with a remote controller and a sensor. More particularly, the present invention relates to a multi-purpose control device that utilizes a remote controller and a human body sensor to actuate a load.

2. Description of the Prior Art

At present, almost all families utilize electric power. Generally, to distribute indoor electric power, a fixed system of electric lines is used. The fixed system of electric lines requires that point to point electric lines be installed inside walls, ceilings or floors prior to the completion of construction of a building. For most fixed light fixtures, e.g. pendent lights, ceiling lights and chandeliers, electric lines between the lights and their switches are installed along a predetermined path inside walls and ceilings. Once the installation of the electric lines is completed, the paths of electric lines are fixed. This is the technique used for most fixed lighting fixtures. As electrical and electronic control techniques have improved, alternatives to the conventional hard-wired ON/OFF switch used for fixed light fixtures have become available. In fact, wireless remote controllers are utilized in controlling televisions, stereo apparatus and air conditioners, etc. Remote controllers are becoming more prevalent in controlling electronic equipment. However, remote controllers are not widespread in controlling non-electronic devices such as fixed light fixutes. This is partly because the addition of remote controllers may result in the problem of reconfiguration of wiring, and partly because in certain cases, utilizing remote controllers is not practical. For example, when entering a house at night, it is necessary to locate a remote controller in the dark first, then the remote controller is used to turn on the light. In this sense, it is not convenient to use remote controllers to turn on or off fixed light fixtures.

Therefore, there is a need for a control device that not only receives a remote control signal emitted from a remote controller but also senses human bodies entering an indoor region.

SUMMARY OF THE INVENTION

The main purpose of the present invention is to provide a multi-purpose control device utilizing a remote controller and a human body sensor to actuate a load, thereby the conventional problem of searching for a remote controller in the dark to turn on a light is solved.

To this end, the present invention provides a multi-purpose control device with a remote controller and a sensor, which comprises:

a detecting body;

a remote controller for controlling the detecting body by emitting a remote control signal; and a receiver connected to a light and receiving the signal emitted from the detecting body;

wherein the detecting body is positioned at an entry way to form a sensing region, thereby the detecting body is able not only to receive a remote control signal emitted from the remote controller but also to sense human bodies entering the sensing region, after the detecting body receives the remote control signal or senses a human body entering the sensing region, the detecting body emits a signal to the receiver to actuate a light.

The control device in accordance with the present invention does not require reconfiguration of the wiring. In addition, the present invention can sense a human body entering a sensing region in the dark to actuate a light automatically, thereby resolving the problem of searching for a remote controller in the dark.

The remote controller in accordance with the present invention comprises a processor, a modulation circuit and an infrared emitter. The processor has three input terminals, each of which is connected to buttons of "ON ", "OFF " and "AUTO " respectively. The "AUTO " button is used to emit a signal to switch the detecting body to actuate a light by sensing a human body.

The remote controller in accordance with the present invention further comprises a display connected to an output terminal of the processor, a "TIME " button and a "LUX " button, wherein said "TIME " button and said "LUX " buttons are connected to the input terminals of the processor. The display is used to display the function of all settings. The "TIME " button is used to set the duration that the light is turned-on. The "LUX " button utilizes the human body sensing function of the detecting body to control the ON/OFF of the light. The "LUX " button can set the time when the detecting body is working. When the brightness inside is above a predetermined brightness level, the detecting body will not emit a signal to turn on the light.

The detecting body comprises a processor, an encoder and an emission circuit, in which the processor has two input ports, one connected to a remote control detecting device and the other to a human body sensing device. The remote control detecting device comprises an infrared receiver, an amplifying circuit and a decoder. When the infrared signal is received, the received infrared signal is amplified and decoded and sent to the processor.

The human body sensing device comprises a passive infrared sensor, an amplifying circuit and a determining circuit. The passive infrared sensor covers an infrared sensing region. When a human body enters the infrared sensing region, the passive infrared sensor senses the heat of the human body and creates a signal. The created signal is amplified by the amplifying circuit. After the amplified signal is corrected by the determining circuit, the signal is output to the processor.

The receiver comprises a receiving circuit, a wireless amplifying circuit, a decoder and a relay, wherein the relay is connected to the light to control the light.

The detecting body further comprises a time-and-lux setting circuit and a buzzer. The time-and-lux setting circuit is controlled by the human body sensing device and the "TIME " button and "LUX " buttons in the remote controller and comprises a time-setting element and a lux-setting element. The time-setting element sets the working time duration of the light after the human body sensing device senses a human body. The lux-setting element turns on the light when the brightness in an indoor region is below a predetermined brightness level. Therefore, the lux-setting element can reduce energy consumption.

The forgoing and other aspects of the present invention will become apparent from the following detailed description of the invention when considered in conjunction with the accompanying drawings.

DETAILED DESCRIPTION OF THE PREFERRED EMBODIMENT

Figure 1:
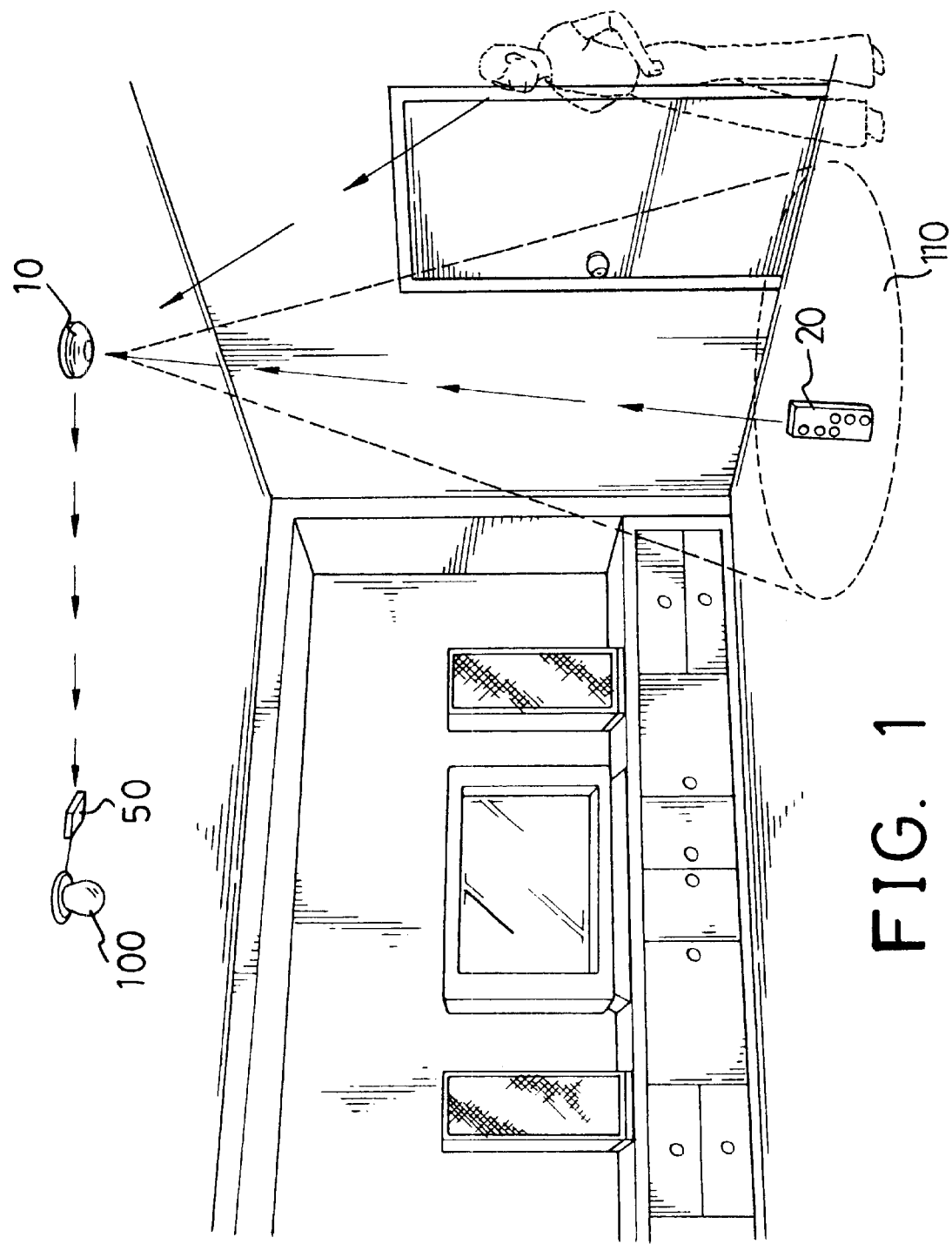
FIG. 1 is a schematic diagram of a multi-purpose control device in accordance with the present invention.

As shown in FIG. 1, a multi-purpose control device in the present invention provides a detecting body 10 at an entrance. The detecting body 10 has a human body sensing device 40 and a remote control detecting device 30. The human body sensing device 40 (FIG. 2) can sense a human body entering a passive infrared sensing region near an entry way 110. The remote control detecting device 30 can receive a remote control signal from a remote controller 20.

After receiving a remote control signal or sensing a human body entering the sensing region, the detecting body 10 emits a signal to a receiver 50 near a light 100. The receiver 50 can turn the light 100 on or off. Therefore, the light 100 is controlled by a remote controller 20 or the human body sensing device 40.

Figure 2:
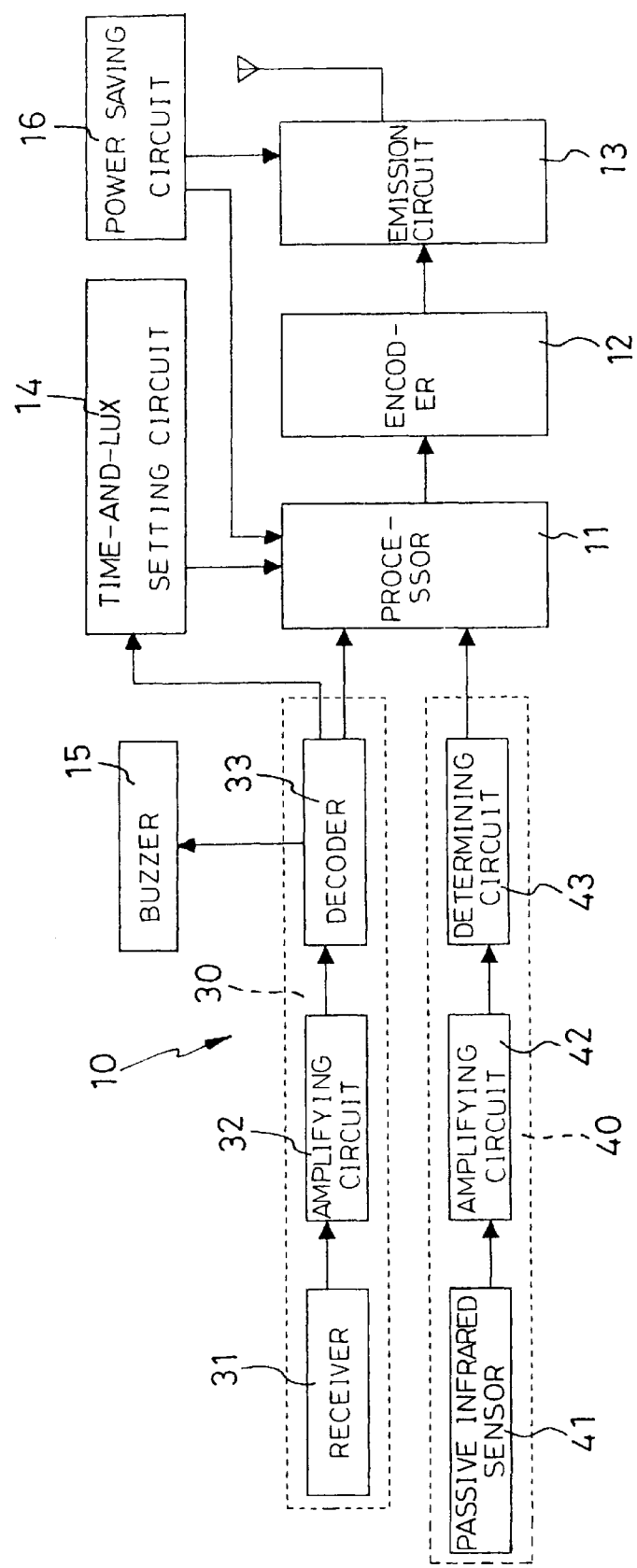
FIG. 2 is a block diagram of the circuit of the detecting body of the present invention.

As shown in FIG. 2, the detecting body 10 comprises a human body sensing device 40, a remote control detecting device 30, a processor 11, an encoder 12, an emission circuit 13, a time-and-lux setting circuit 14 and a power saving circuit 16. The processor 11 has two input ports, one is connected to a remote control detecting device 30 and the other to a human body sensing device 40.

Figure 3:
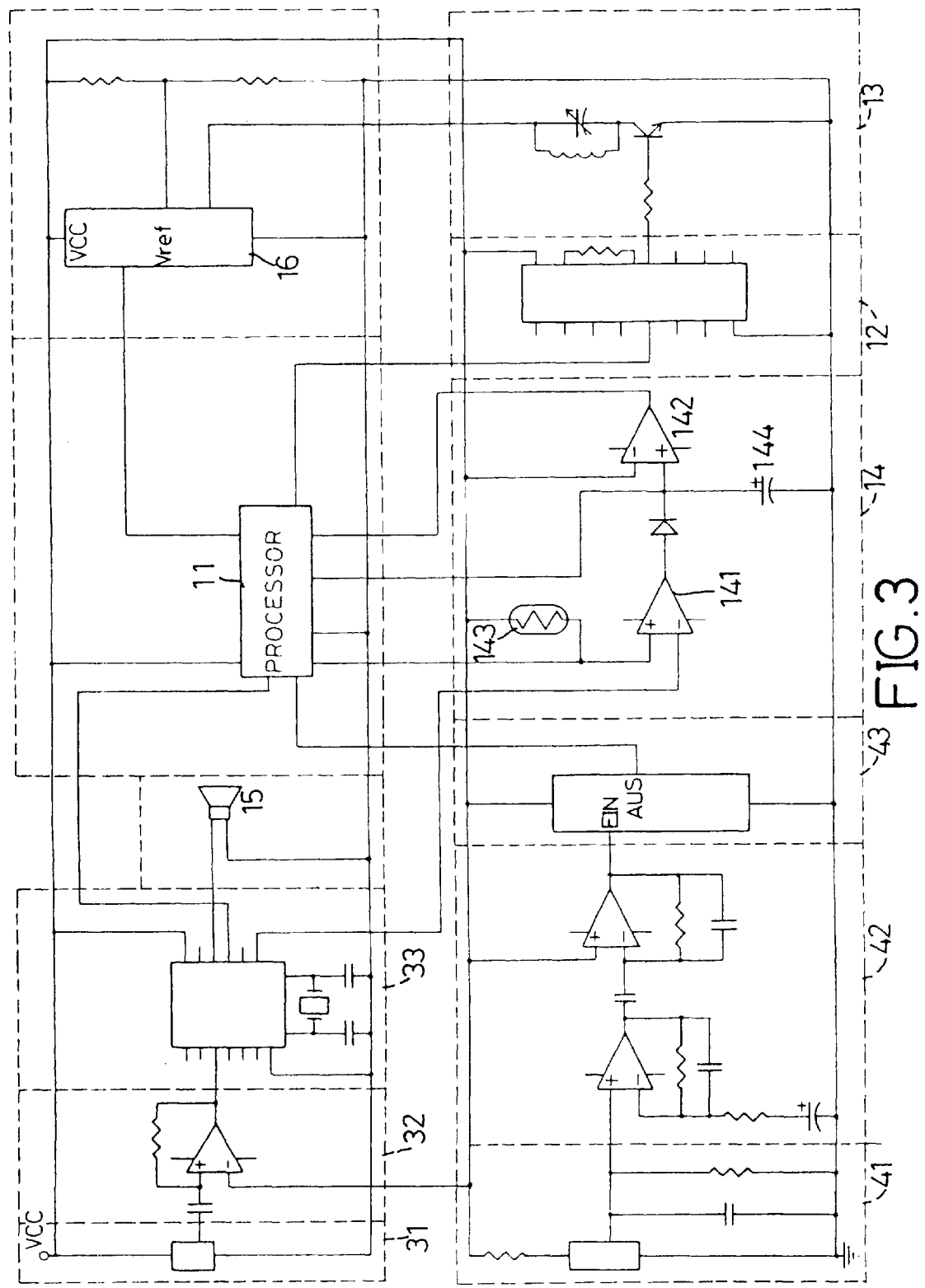
FIG. 3 is a detailed circuit diagram of the detecting body of the present invention.

The detailed circuit diagram of the detecting body of the present invention is shown in FIG. 3. The remote control detecting device 30 comprises an infrared receiver 31, an amplifying circuit 32 and a decoder 33. When the infrared signal is received, the received infrared signal is amplified and decoded, and is then sent to the processor 11.

The decoder 33 comprises three output terminals connected to the processor 11 the time-and-lux setting circuit 14 and a buzzer 15. After the infrared receiver 31 receives an infrared signal from the remote controller 20 and the received infrared signal is amplified and decoded, the decoded signal is sent to the processor 11, the time-and-lux setting circuit 14 and a buzzer 15. The buzzer 15 may generate a sound that can be heard by the user to confirm that the emitted signal has been received.

The human body sensing device 40 comprises a passive infrared sensor 41, an amplifying circuit 42 and a determining circuit 43. The passive infrared sensor 41 covers an infrared sensing region. When a human body enters the infrared sensing region, the passive infrared sensor 41 senses the heat of the human body and creates a signal. The created signal is amplified by the amplifying circuit 42. After the amplified signal is corrected by the determining circuit 43, the signal is output to the processor 11. The determining circuit 43 comprises a comparator to confirm whether the sensed signal is created by a human body.

The time-and-lux setting circuit 14 is used to control the duration that the light is turned on and the brightness level in the indoor area in which the human body sensing device 40 needs to function. The time-and-lux setting circuit 14 comprises a first comparator 141, a second comparator 142, an optical device 143 and a capacitor 144. The negative input terminal of the first comparator 141 is connected to an output terminal of the encoder 33, and the positive input terminal of the first comparator 141 is connected to the processor 11 and the optical device 143. The positive input terminal of the second comparator 142 is connected to the output terminal of the first comparator 141, the capacitor 144 and an output pin of the processor 11, and the output terminal of the second comparator 142 is connected to the processor 11.

When the remote control detecting device 30 receives a lux level setting signal from the remote controller 20, the decoder 33 sends a signal to the time-and-lux setting circuit 14 and the processor 11. At this time, the processor 11 changes the resistance of the inner resistor connected to the first comparator 141 based on the input signal from the decoder. Because the resistance of the optical device 143 changes according to the brightness level in the indoor region, the changed resistance of the optical device 143 associated with the resistance of the inner resistor of the output pin of the processor 11 may generate various reference voltage levels in the positive input terminal of the first comparator 141. Thereby the time-and-lux setting circuit 14 determines at what brightness level in the indoor region that the first comparator 141 outputs a high voltage. The output high voltage is sent to the processor 11 through the second comparator 142 to make the processor 11, through the encoder 12 and the emission circuit 13, actuate the light 100. Therefore, the user may determine below what brightness level in the indoor region that the human body sensing device 40 needs to function to avoid wasting power.

When the remote control detecting device 30 receives a time setting signal emitted from the remote controller 20, the decoder 33 sends a signal to the time-and-lux setting circuit 14 and the processor 11. The processor 11 changes the resistance of the inner resistor connected to the positive input terminal of the second comparator 142 according to the input signal. At this time, the inner resistor of the processor 11 and the capacitor 144 constitute a RC charging/discharging circuit. The time constant of the RC charging/discharging circuit is determined by the inner resistance of the inner resistor of the processor 11. Therefore, the processor 11 may change the time constant of the RC charging/discharging circuit by changing the resistance of the inner resistor of the processor 11. The resistance of the inner resistor of the processor 11 may be changed by the emitted signal from the remote controller 20.

When the human body sensing device 40 senses the heat of the human body and sends a signal to the processor 11, the processor 11 continuously sends a signal to actuate the emission circuit 13 to emit a signal to a receiver 50. Then the light 100 is turned on. At this time, the capacitor 144 is charged. When the capacitor 144 is saturated and begins to discharge, a high voltage is created at the positive input terminal of the second comparator 142, and then a high voltage is output from the output terminal of the second comparator 142 to the processor 11. Upon receiving the signal from the second comparator 142, the processor 11 ceases to output the signal to actuate the light 100, and the light 100 is turned off.

The power saving circuit 16 can be used when the detecting body 10 utilizes a dry battery as the power source. The power saving circuit 16 comprises a comparing circuit. A reference voltage is obtained from two resistors for dividing a voltage. The comparing circuit is connected to the processor 11 and the emission circuit 13 to detect the voltage level of the dry battery. When the voltage of the battery is below a predetermined voltage level, the processor 11 and the emission circuit 13 are turned off to reduce power consumption of the battery.

Figure 4:
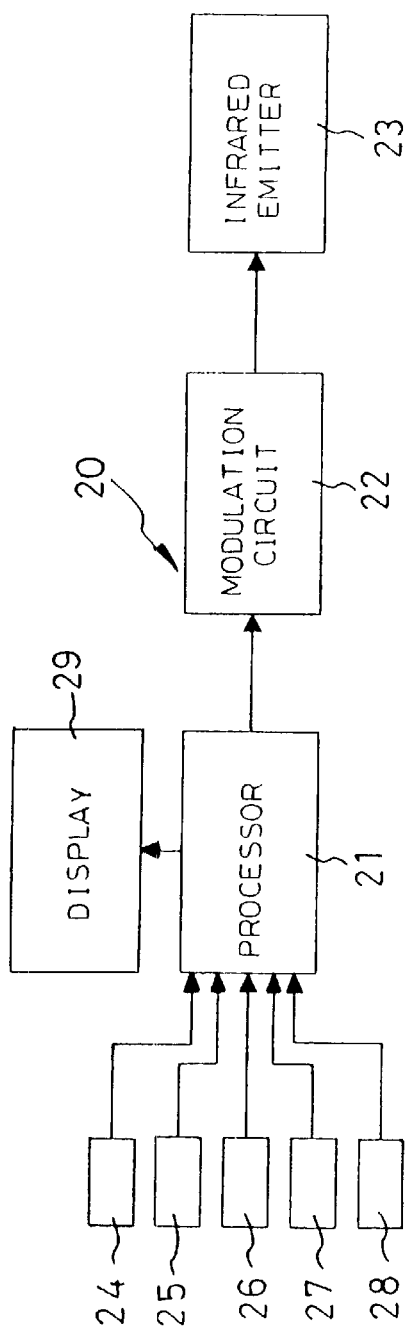
FIG. 4 is a block diagram of the circuit of the remote controller of the present invention.
Figure 5:
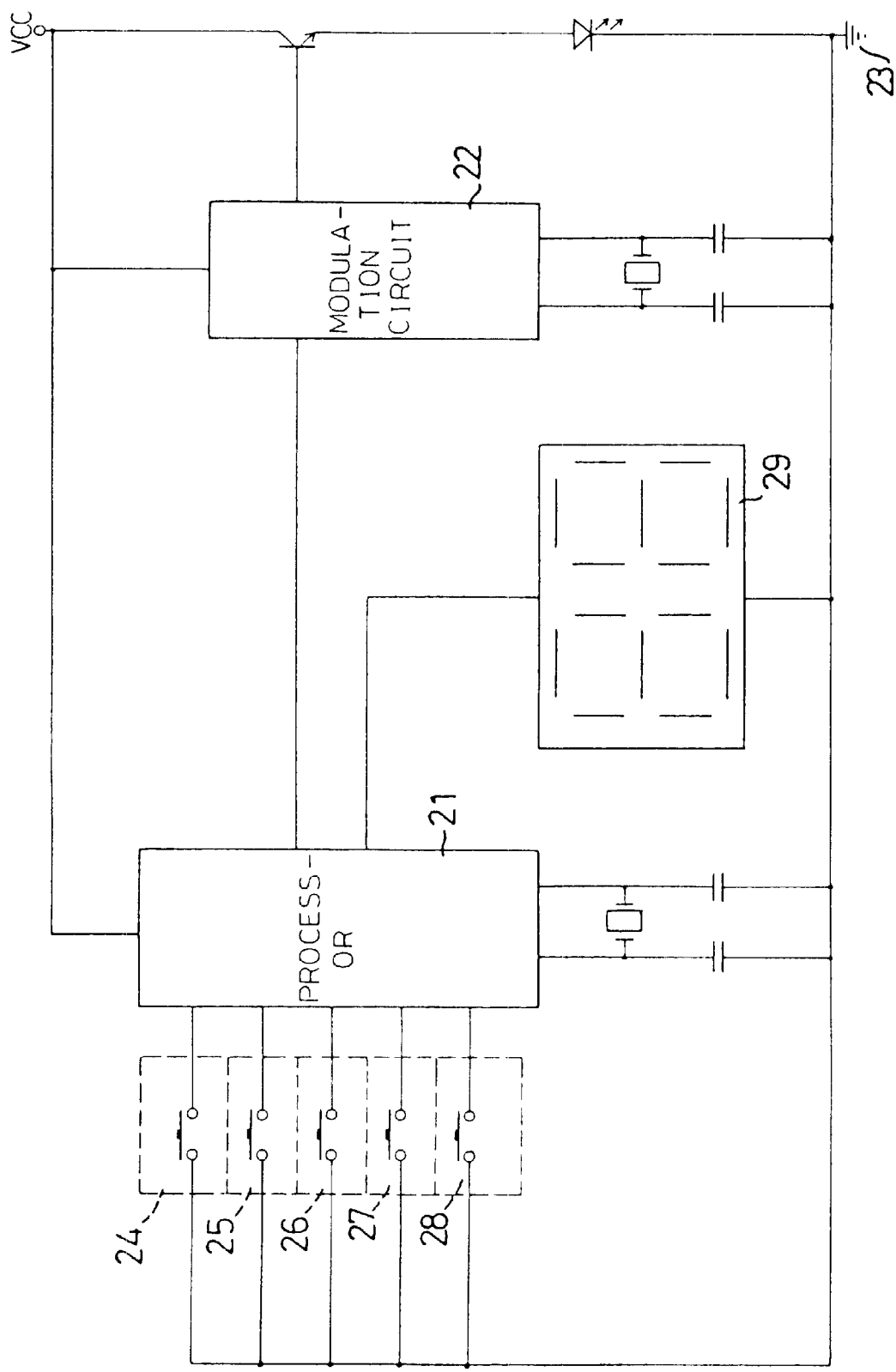
FIG. 5 is a detailed circuit diagram of the remote controller of the present invention.

As shown in FIG. 4 and FIG. 5, the remote controller 20 in accordance with the present invention comprises a processor 21, a modulation circuit 22, an infrared emitter 23 and a display 29. The processor 21 has five input terminals, which are connected to "ON ", "OFF ", "AUTO ", "TIME " and "LUX " 24, 25, 26, 27, 28 buttons. The "ON " button 24 is used to turn on the light 100. The "OFF " button 25 is used to turn off the light 100. The "AUTO " button 26 is used to emit a signal to switch the detecting body to actuate a light 100 by sensing a human body. The "TIME " button 27 cooperates with the time-and-lux setting circuit 14 of the detecting body 10. The "TIME " button 27 is used to set the duration that the light 100 is turned on after the detecting body 10 senses a human body and the light is turned on. The "LUX " button 28 also cooperates with the time-and-lux lux setting circuit 14 of the detecting body 10. The "LUX " button 28 controls the implementation of the human body sensing function of the detecting body 10 only when the brightness level in an indoor region is below a predetermined level. The display 29 displays the set or selected contents.

Figure 6:
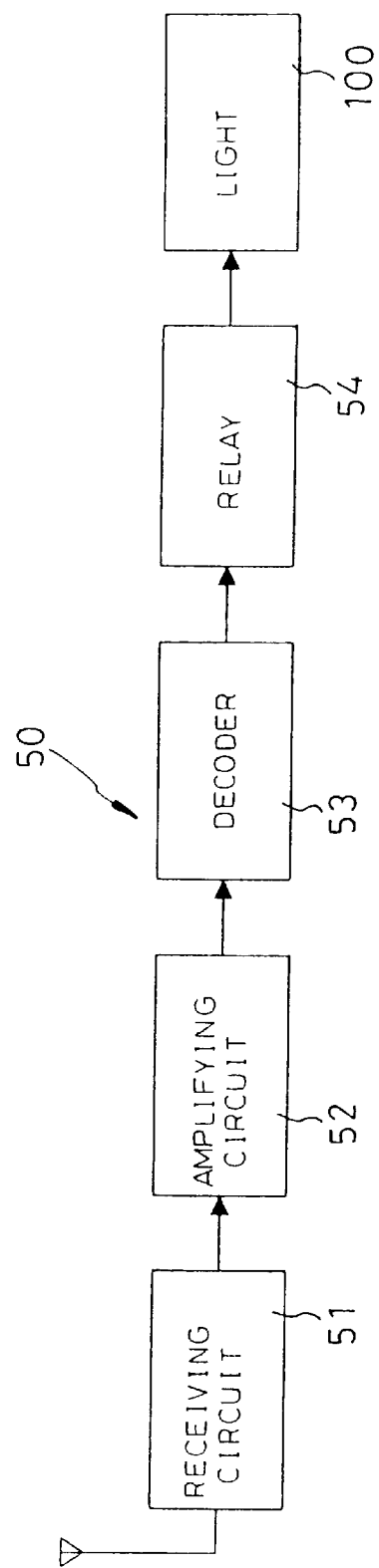
FIG. 6 is a block diagram of the circuit of the receiver of the present invention.
Figure 7:
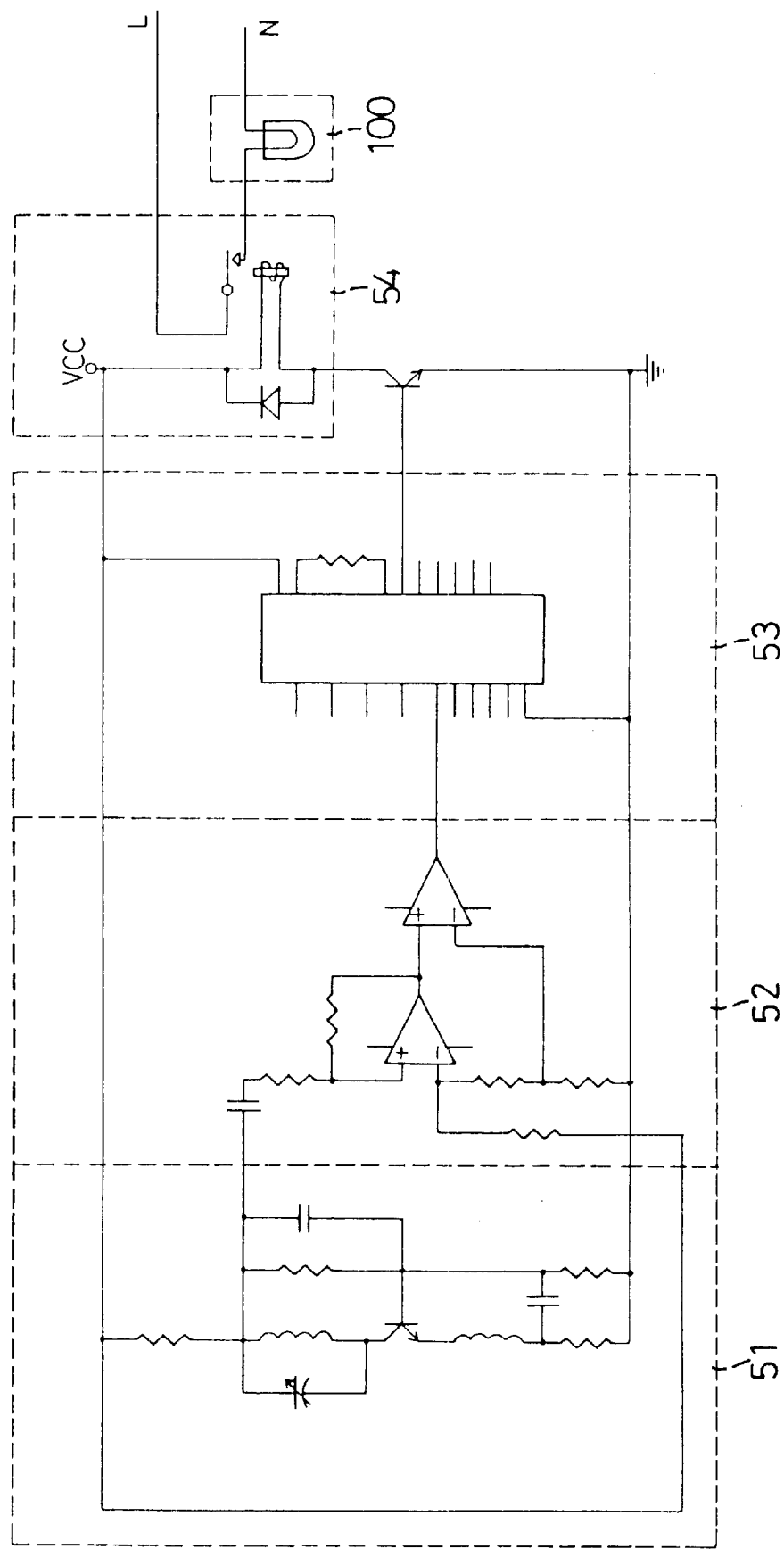
FIG. 7 is a detailed circuit diagram of the receiver of the present invention.

As shown in FIGS. 6 and 7, a receiver 50 comprises a receiving circuit 51, a wireless amplifying circuit 52, a decoder 53 and a relay 54. The relay 54 is connected to the light 100 to control the light 100.

The detecting body 10 can turn the light 100 on or off by signals from either the remote controller 20 or the human body sensing device 40. When a user is inside the entrance of a room, he can utilize the "ON " and "OFF " buttons 24, 25 on the remote controller 20 to turn the light 100 on or off. When the user presses either "ON " or "OFF " button 24, 25, a signal is emitted from the remote controller 20 toward the detecting body 10. After the detecting body 10 receives the emitted signal from the remote controller 20, the emission circuit 13 in the detecting body 10 emits a control signal to the receiver 50 near the light 100. After the receiver 50 receives the control signal from the detecting body 10, the receiver 50 amplifies the control signal and decodes the amplified signal. The receiver 50 utilizes the decoded signal to turn the light 100 on or off by the relay driving circuit 54.

When the user goes outdoors, he can use the remote controller 20 to emit a control signal to turn off the light 100. In the meantime, he can press the "AUTO " button 26 on the remote controller 20 to switch the controlling pattern of the detecting body 10 to the pattern of sensing a human body by the human body sensing device 40. The passive infrared sensor 41 in the human body sensing device 40 covers an infrared sensing region. When a human body enters the infrared sensing region, the passive infrared sensor 41 senses the heat of the human body and creates a signal. The created signal is amplified by the amplifying circuit 42. After the amplified signal is corrected by the determining circuit 43, the signal is output to the processor 11. Then the detecting body 10 utilizes the emission circuit 13 to emit a signal to the receiver 50 to turn on the light 100, thereby resolving the problem of searching for a remote controller in the dark.

Because the user can utilize the "TIME " and "LUX " buttons 27, 28 of the remote controller 20 to set "time " and "lux ", when the brightness in an indoor region is above a predetermined level, even though a human body passes through the sensing region, the detecting body 10 will not emit a signal to turn on the light 100. Therefore, the present invention can reduce energy consumption. Furthermore, when the human body sensing function of the detecting body 10 is used, the duration that the light 100 is turned on can be set to determine when the light 100 can be actuated.

From the above, the present invention mainly provides a multi-purpose control device, which utilizes both of a remote controller and a human body sensor to control the ON/OFF state of a load. When a light is controlled, the present invention not only uses a remote controller to control the ON/OFF state of a light for convenience, but also uses a sensor to sense a human body in the dark. Therefore, the present invention can obviate the inconvenience of searching for a remote controller in the dark.

It should be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A multi-purpose control device comprising:

a remote controller to emit a remote control signal, and comprising a processor, a modulation circuit, an infrared emitter and a display that is connected to the output terminal of the processor of the remote controller, wherein first, second, third, fourth and fifth input ports of the processor of the remote controller are respectively connected to "ON", "OFF", "AUTO", "TIME" and "LUX" buttons provided in the remote controller;

a detecting body comprising:

a remote control detecting device comprising a remote control signal receiver for receiving said remote control signal from said remote controller, an amplifying circuit for amplifying said received remote control signal and a first decoder for decoding said amplified remote control signal, wherein the output terminal of said first decoder is connected to a buzzer to generate a sound that can be heard by the user to confirm the emitted signal having been received;

a human body sensing device for sensing a human body entering a passive infrared sensing region near an entry way said human body sensing device comprising a passive infrared sensor, an amplifying circuit and a determining circuit for correction:

a processor having two input ports, one connected to said remote control detecting device and the other connected to said human body sensing device, respectively.

an encoder;

an emission circuit for emitting an infrared signal; and a receiver connected to a light source to receive said infrared signal emitted from said detecting body and comprising a receiving circuit, a wireless amplifying circuit, a second decoder and a relay, said relay being connected to the light source to control the light source, said detecting body being positioned at said entry way to form said sensing region and to sense a human body entering said sensing region, whereby said detecting body emits said infrared signal to said receiver to actuate said light source;

a time-and-lux setting circuit, wherein said time-an-lux setting circuit is used to control the duration that said light source is turned on and the brightness level in the indoor area that said human body sensing device needs to function, said time-and-lux setting circuit comprising a first comparator, a second comparator, an optical device and a capacitor, wherein the negative input terminal of said first comparator is connected to an output terminal of said encoder, the positive input terminal of said first comparator is connected to said processor and said optical device, the positive input terminal of said second comparator is connected to the output terminal of said first comparator, said capacitor and an output pin of said processor, and the-output terminal of said second comparator is connected to said processor.

2. The multi-purpose control device as claimed in claim 1, wherein the receiver and the light source are combined together.

3. The multi-purpose control device as claimed in claim 1, wherein the receiver and the light source are separate.

* * * * *